US011713769B2

(12) United States Patent
Greenfield et al.

(10) Patent No.: US 11,713,769 B2
(45) Date of Patent: Aug. 1, 2023

(54) IMPELLER

(71) Applicant: Hamilton Sundstrand Corporation, Charlotte, NC (US)

(72) Inventors: Jacob Greenfield, Granger, IA (US); Thomas J. Ocken, Des Moines, IA (US); John Sypek, Chicopee, MA (US); Andrew W. Solomon, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 3 days.

(21) Appl. No.: 17/235,796

(22) Filed: Apr. 20, 2021

(65) Prior Publication Data

US 2021/0324870 A1    Oct. 21, 2021

Related U.S. Application Data

(60) Provisional application No. 63/012,850, filed on Apr. 20, 2020.

(51) Int. Cl.
*F04D 29/24* (2006.01)
*F04D 29/22* (2006.01)
*B33Y 80/00* (2015.01)

(52) U.S. Cl.
CPC ......... *F04D 29/242* (2013.01); *F04D 29/225* (2013.01); *B33Y 80/00* (2014.12); *F05D 2250/11* (2013.01)

(58) Field of Classification Search
CPC .................. F05D 2250/11; F04D 29/242
See application file for complete search history.

(56) References Cited

U.S. PATENT DOCUMENTS

| 5,467,613 | A | * | 11/1995 | Brasz | F25B 11/02 60/671 |
|---|---|---|---|---|---|
| 7,281,901 | B2 | * | 10/2007 | Garman | B22F 5/10 416/213 R |
| 8,727,729 | B2 | | 5/2014 | Noronha et al. | |
| 9,140,138 | B2 | * | 9/2015 | Corson | F01D 25/24 |
| 9,533,485 | B2 | | 1/2017 | Marshall et al. | |
| 9,868,155 | B2 | | 1/2018 | Gerber et al. | |
| 2007/0116561 | A1 | * | 5/2007 | Hill | F04D 29/703 415/206 |

(Continued)

FOREIGN PATENT DOCUMENTS

| CN | 209469602 | * | 1/2019 | ............. F04D 25/08 |
|---|---|---|---|---|
| GB | 1036486 | A | 7/1966 | |

OTHER PUBLICATIONS

Extended European Search Report issued in corresponding EP application No. 21169432.8, dated Aug. 17, 2021.

*Primary Examiner* — Courtney D Heinle
*Assistant Examiner* — Andrew J Marien
(74) *Attorney, Agent, or Firm* — Locke Lord LLP; Scott D. Wofsy; Gabrielle L. Gelozin

(57) ABSTRACT

An impeller includes a housing having a fluid inlet cavity defining a rotational axis. A plurality of vane are inlets arranged along an inner surface of the fluid inlet cavity and a plurality of vane outlets are circumferentially arranged along a rim of the housing. Each of the vane outlets is fluidly connected to a corresponding vane inlet by a corresponding internal channel situated internal to the housing. Each of the channels maintains a triangular cross-section from the vane inlet to the vane outlet.

15 Claims, 3 Drawing Sheets

(56) References Cited

U.S. PATENT DOCUMENTS

| | | |
|---|---|---|
| 2009/0185906 A1 | 7/2009 | Taylor |
| 2016/0243620 A1 | 8/2016 | Butcher |
| 2018/0266433 A1 | 9/2018 | Iurisci et al. |
| 2018/0355883 A1* | 12/2018 | Pulnikov ................ B33Y 10/00 |
| 2019/0003322 A1 | 1/2019 | Rettberg et al. |
| 2019/0210111 A1 | 7/2019 | Army et al. |
| 2019/0374732 A1 | 12/2019 | Cariola et al. |
| 2020/0040739 A1 | 2/2020 | Notarnicola et al. |

* cited by examiner

IMPELLER

CROSS-REFERENCE TO RELATED APPLICATIONS

This application claims priority to and the benefit of U.S. Provisional Application No. 63/012,850, filed Apr. 20, 2020, the entire contents of which are herein incorporated by reference in their entirety.

BACKGROUND

Technological Field

The present disclosure relates to an impeller, and more particularly to an impeller formed using additive manufacturing techniques.

Description of Related Art

A variety of impellers and impeller manufacturing techniques are known. However, typical conventional methods require long lead times and low delivery performance metrics, for example, current impeller lead times typically require 400 days. These models and methods require brazing and subsequent testing to ensure joint integrity, which adds further costs and manufacturing time. Although typical methods have generally been considered satisfactory for their intended purpose, there is still a need in the art for an improved impeller and method of making it. The present disclosure may provide a solution for at least one of these remaining challenges.

SUMMARY OF THE INVENTION

An impeller includes a housing having a fluid inlet cavity defining a rotational axis. A plurality of vane are inlets circumferentially arranged along an inner surface of the fluid inlet cavity and a plurality of vane outlets are circumferentially arranged along a rim of the housing. Each of the vane outlets is fluidly connected to a corresponding vane inlet by a corresponding internal channel situated internal to the housing. Each of the channels maintains a triangular cross-section the vane inlet to the vane outlet.

Each of the channels can follow a coiled path around the rotational axis from the vane inlet to the vane outlet. Each coiled path can maintains a downward slope from the vane inlet to the vane outlet.

Each cross-section of each of the internal channels can maintain an equal flow area from the vane inlet to the vane outlet. The internal channels can include at least two differing cross-sections from the vane inlet to the vane outlet which change smoothly from the vane inlet to the vane outlet. Each of the vane outlets can include a cross-section having an isosceles triangle. Each of the isosceles triangles can include base angles between 30 and 70 degrees.

The fluid inlet cavity can include a cylindrical section including a wall parallel to the rotational axis, and a funneling section including a converging wall. The funneling section includes the plurality of vane inlets. The vane inlet cross-sections can be not parallel and not perpendicular to the vane outlets.

A method of making an impeller comprising includes forming a housing of an impeller including vanes having the triangular cross-section internal to the housing by laser powder bed fusion. The housing can include metallic materials. Forming can include a build direction from a vane outlet to a vane inlet and a build direction from an impeller base to the impeller inlet cavity.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
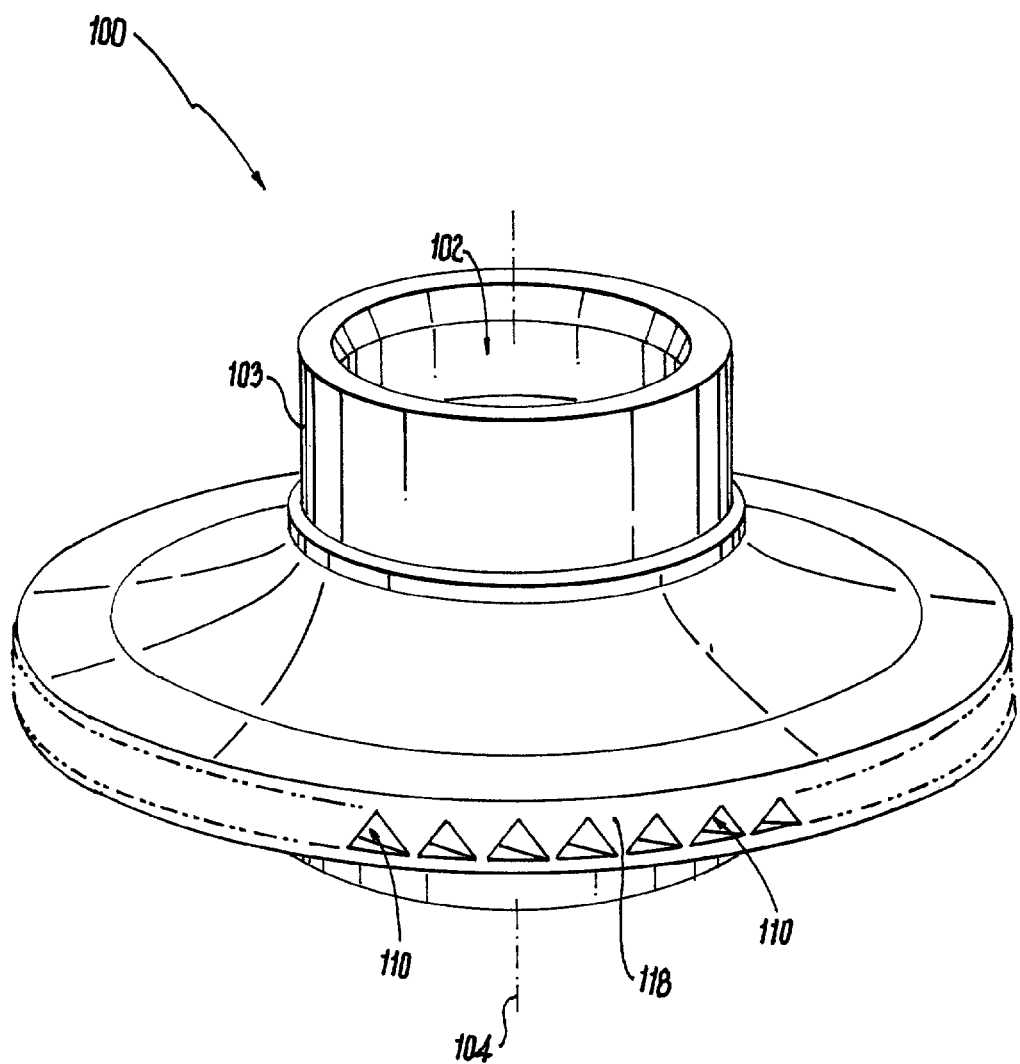
FIG. 1 is a perspective view of an impeller.

Reference will now be made to the drawings wherein like reference numerals identify similar structural features or aspects of the subject invention. For purposes of explanation and illustration, and not limitation, a partial view of an exemplary embodiment of an impeller in accordance with the invention is shown in FIG. 1 and is designated generally by reference character 100. Other embodiments of the impeller in accordance with the invention, or aspects thereof, are provided in FIGS. 2-3, as will be described. The methods and systems of the invention can be used to simplify manufacturing techniques with respect to legacy parts.

FIG. 1 shows an impeller 100 having a fluid inlet cavity 102 defining a rotational axis 104. The impeller housing receives a fluid such as fuel via the fluid inlet cavity 102 and sprays the fluid out of vane outlets 110. The fluid inlet cavity 102 includes a cylindrical section 103 including a wall 106 parallel to the rotational axis 104. Below the cylindrical section 103 is a funnel section 108 (shown in FIG. 3). The funnel section 108 includes a converging wall 112 allowing the fluid to funnel to a common area including a plurality of vane inlets 114.

Figure 2:
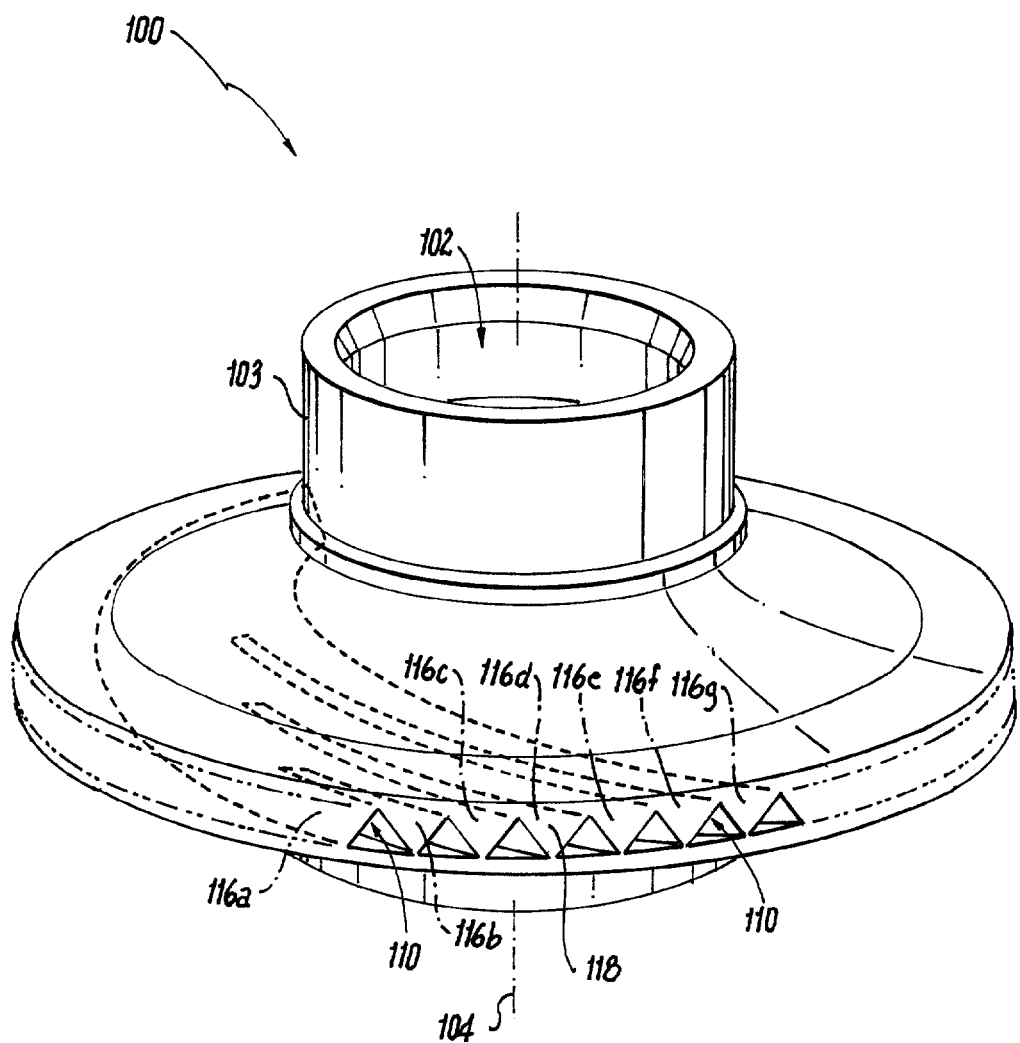
FIG. 2 is a perspective view of FIG. 1, showing the internal vanes of the impeller.
Figure 3:
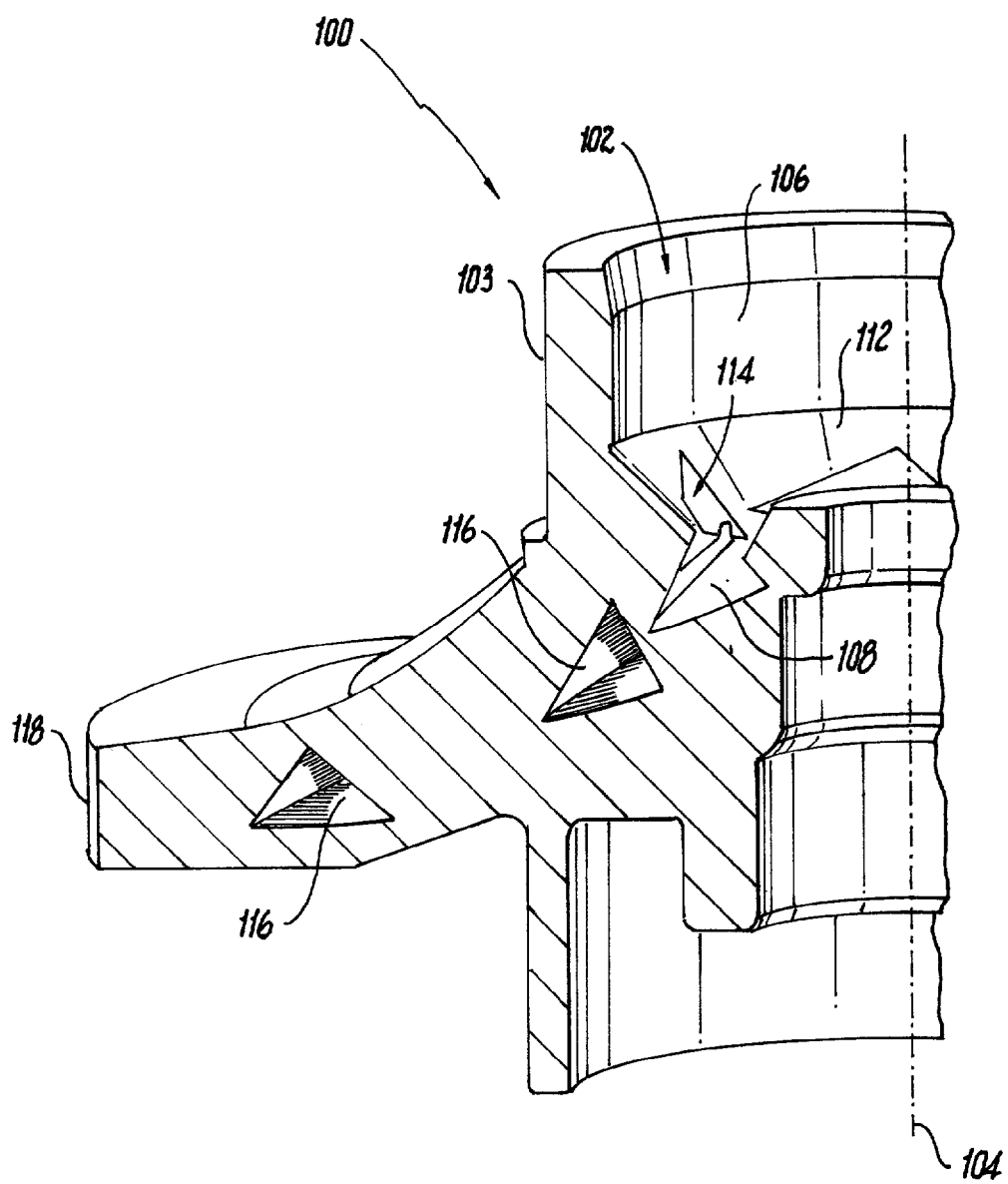
FIG. 3 is a side view of FIG. 1, showing a cutaway of the impeller.

FIG. 2 shows a corresponding channels 116, which are subsequently split into multiple channels (116a, 116b, 116c . . . 116f), situated internal to the impeller 100 connecting each of the vane inlets 114 to a corresponding vane outlet 110. Some of the channels 116 can split into multiple channels at a point within the impeller. The vane outlets 110 are shown distributed circumferentially along a rim 118 below the fluid inlet cavity 102 of the impeller 100. Both the vane inlets 114 and the vane outlets 110 have a triangular cross-section. Each of the channels 116, 116a, and 116b also include and maintain a triangular cross-section throughout their length. The vane inlet 114 cross-sections are not parallel and not perpendicular to the vane outlets 110 cross-sections since the vane inlets 114 are situated in the funnel section 108 and the vane outlets 110 are located on the rim 118. FIG. 2 further shows each of the channel 116 following a coiled path around the rotational axis 104 from each vane inlet 114 to the vane outlet 110. Each channel 116 maintains a slope from the vane inlet 114 to the vane outlet 110. Each cross-section of each channel 116 maintains an equal flow area from the vane inlet 114 to the vane outlet 110. However, the channels 116 can include variable cross-sections, wherein the cross-section widens, narrows, or splits into two channels 116-116f as required in certain sections or portions of the channel between the vane inlet 114 and the vane outlet 110. The resulting outlet of channels 116a-116f can have a differing cross-section and/or area. FIG. 3 shows a cutaway view of the impeller 100 showing different sizes of cross-sections at differing locations along each individual path. Each of the cross-sections can include various shapes including isosceles triangles, wherein each of the isosceles triangles can include base angles between 30 and 70 degrees. Varying a cross-section of the channel 116, 116a, 116b, allows the shape of the vane inlet 114 to differ from the shape at the vane outlet 110 based on the envelop constraints from the system which would drive the upper and lower shroud geometry.

A method of making the impeller 100 is also disclosed. The impeller 100 and channels 116 are formed using laser powder bed fusion. The additive manufacturing technique allows the intricate geometries of the channels 116 to be formed. This technique eliminates the need for castings, which require brazing and subsequent non-destructive testing. The triangular shapes of the channels 116 and the variable cross-sections allow the channels 116 to be shaped for specific application. The impeller 100 includes metallic materials, which can be, as non-limiting examples, different types or grades of aluminums, stainless steels, or high-temperature nickel alloys. Forming the impeller and channels can include a build direction from a vane outlet to a vane inlet and a build direction from an impeller base to the impeller inlet cavity.

The methods and systems of the present disclosure, as described above and shown in the drawings, provide for an impeller 100 with superior properties including decreased production costs. While the apparatus and methods of the subject disclosure have been shown and described with reference to embodiments, those skilled in the art will readily appreciate that changes and/or modifications may be made thereto without departing from the spirit and score of the subject disclosure.

What is claimed is:

1. An impeller comprising:
   a housing having:
      a fluid inlet cavity defining a rotational axis, including a plurality of vane inlets circumferentially arranged along an inner surface of the fluid inlet cavity; and
      a plurality of vane outlets circumferentially spaced along a rim of the housing, each of the vane outlets being fluidly connected to a corresponding vane inlet by a corresponding channel situated internal to the housing, wherein each of the channels maintains a triangular cross-section from each vane inlet to each vane outlet, wherein the fluid inlet cavity includes a cylindrical section including a wall parallel to the rotational axis, and a funneling section including a converging wall, wherein the converging wall extends from the cylindrical portion into the fluid cavity, converging in a direction of flow into the fluid inlet towards the rotational axis, wherein the converging wall and funneling section are configured to allow fluid in the fluid inlet to funnel to a common area, the common area including the plurality of vane inlets.

2. The impeller of claim 1, wherein each of the internal channels follows a coiled path around the rotational axis from the vane inlet to the vane outlet.

3. The impeller of claim 2, wherein each coiled path maintains a slope from the vane inlet to the vane outlet.

4. The impeller of claim 1, wherein each cross-section of each of the internal channels maintains an equal flow area from the vane inlet to the vane outlet.

5. The impeller of claim 1, wherein each of the vane outlets includes a cross-section having an isosceles triangle.

6. The impeller of claim 5, wherein each of the isosceles triangles includes base angles between 30 and 70 degrees.

7. The impeller of claim 1, wherein the internal channels include at least two differing cross-sections from the vane inlet to the vane outlet.

8. The impeller of claim 7, wherein the cross-section of the internal channels changes does not include a step therein from the vane inlet to the vane outlet.

9. The impeller of claim 1, wherein the vane inlet cross-sections are not parallel and not perpendicular to the vane outlets.

10. The impeller of claim 1, wherein the funneling section includes the plurality of vane inlets.

11. The impeller of claim 1, wherein the material of the housing includes metallic materials.

12. A method, comprising:
   forming the impeller housing of claim 1 using laser powder bed fusion.

13. A method of making an impeller comprising the steps of:
   forming a housing of the impeller including vanes having a triangular cross-section, from a respective vane inlet to a respective vane outlet, internal to the housing by laser powder bed fusion, wherein forming the housing includes forming a fluid inlet cavity defining a rotational axis and having a cylindrical section including a wall parallel to the rotational axis and a funneling section including a converging wall, wherein the converging wall extends from the cylindrical portion into the fluid cavity, converging in a direction of flow into the fluid inlet towards the rotational axis, wherein the converging wall and funneling section are configured to allow fluid in the fluid inlet to funnel to a common area, the common area including at least the respective vane inlet.

14. The method of claim 13, wherein the forming step includes a build direction from a vane outlet to a vane inlet.

15. The method of claim 13, wherein the forming step includes a build direction from an impeller base to an impeller inlet cavity.

* * * * *